United States Patent

Gebhard et al.

Patent Number: 5,612,397
Date of Patent: Mar. 18, 1997

[54] COMPOSITION HAVING WET STATE CLARITY

[75] Inventors: Matthew S. Gebhard, New Britain; William E. deVry, Malvern; Caren A. Puschak, Norristown, all of Pa.; Anne M. Bacho, Delran, N.J.; Gary R. Larson, Hatfield, Pa.

[73] Assignee: Rohm and Haas Company, Philadelphia, Pa.

[21] Appl. No.: 359,140

[22] Filed: Dec. 19, 1994

[51] Int. Cl.$^6$ .............. C08J 3/00; C08K 3/20; C08L 75/00; C08L 1/00

[52] U.S. Cl. .............. 524/35; 524/42; 524/44; 524/441; 524/444; 524/457; 524/500; 524/590; 524/591; 525/902; 434/84

[58] Field of Search .............. 524/42, 44, 441, 524/444, 457, 500, 590, 591, 35; 525/902; 434/84

[56] References Cited

U.S. PATENT DOCUMENTS

| | | | |
|---|---|---|---|
| 3,026,281 | 3/1962 | Harren et al. | 260/29 |
| 3,035,004 | 5/1962 | Glavis | 260/29 |
| 4,079,028 | 3/1978 | Emmons | 260/29 |
| 4,120,835 | 10/1978 | Goodell | 260/15 |
| 4,155,892 | 5/1979 | Emmons et al. | 260/29 |
| 4,228,277 | 10/1980 | Landoll | 536/90 |
| 4,243,802 | 1/1981 | Landoll | 536/91 |
| 4,277,380 | 7/1981 | Williams et al. | 524/591 |
| 4,325,856 | 4/1982 | Ishikawa et al. | 523/201 |
| 4,425,469 | 1/1984 | Emmons et al. | 524/750 |
| 4,814,373 | 3/1989 | Frankel et al. | 524/460 |
| 4,983,671 | 1/1991 | Numata et al. | 525/63 |
| 5,276,075 | 1/1994 | Santini | 524/40 |
| 5,281,654 | 1/1994 | Eisenhart et al. | 524/500 |
| 5,344,322 | 9/1994 | Wilcox et al. | 434/84 |

FOREIGN PATENT DOCUMENTS 2079926  5/1993  Canada .

OTHER PUBLICATIONS

The Characterization of Polymers, Rohm and Haas Company, 1976.

Uses and Abuses of Photon Correlation Spectroscopy in Particle Sizing, BB Weiner et al., American Chemical Society, pp. 48–61, 1987.

*Primary Examiner*—Paul R. Michl
*Assistant Examiner*—Patrick Niland
*Attorney, Agent, or Firm*—Sudhir G. Desmukh

[57] ABSTRACT

The composition having wet state clarity includes an aqueous latex binder combination of polymer particles with a diameter of less than 80 nanometers and a thickener. When glitter flakes are dispersed in these novel compositions in their wet state, they glitter more than conventional glitter compositions. Thus, they are more appealing to a consumer or an artist than conventional glitter compositions that tend to be cloudy or dull in their wet state.

20 Claims, No Drawings

COMPOSITION HAVING WET STATE CLARITY

This invention generally relates to compositions used in artist, craft and hobby paints, more particularly to compositions having wet state clarity and most particularly to glitter compositions having wet state clarity.

Hand-painted clothing and fabrics have become increasingly popular among consumers over the past several years. Such paintings are typically made by brush applying acrylic paints or by dispensing three dimensional beads or lines from squeezable dispensers directly on fabric or clothing. The popularity of hand painted clothing and fabrics has spurred the development of artist, craft and hobby paints that are designed to allow a consumer to make his or her own hand painted clothing or fabrics.

One of the desirable aesthetic properties in such compositions is to have the color or glitter of the paint in their wet state closely match the color of the paint or glitter in their dry state. Such a paint or glitter is generally produced by dispersing color pigments or flakes of reflective foils of desired color in clear or tinted binders. Glitter compositions glitter when exposed to light. This desirable aesthetic property depends upon the wet state clarity of the binder utilized in such compositions. "Wet state clarity" means the clarity of the binders of the invention in their wet state. "Dry state clarity" means the clarity of the binders of the invention in their dry state. The wet state clarity index ($\Delta L$), described later, for the binder of the present invention is less than 65.

Glitter compositions are known in the art. Santini in U.S. Pat. No. 5,276,075 discloses a conventional acrylic glitter paint consisting of an acrylic polymer having a glass transition temperature (Tg) in the range of 0° C. to 20° C., glitter flakes, and a hydrophobically-modified cellulosic thickener that does not destabilize the glitter flakes dispersed in the paint. One of the problems associated with conventional glitter compositions, such as the composition in Santini, is the dull appearance of the glitters flakes dispersed in such compositions in their wet state. This dull appearance results from the cloudy or milky appearance of the binders typically used in these glitter compositions. This problem is further compounded by the translucent nature of squeezable plastic bottles or tubes in which these glitter compositions are stored. Thus, commercially available glitter compositions contained in such translucent squeezable bottles or tubes appear even more dull when visually examined by a potential purchaser. Because of the milky or cloudy appearance of the conventional glitter binders in their wet state, it becomes harder for a purchaser to appreciate the glitter of these compositions, especially when viewed from a distance, such as, while inspecting glitter paint bottles placed on store racks. Thus, there exists a need for a glitter composition having wet state clarity. The present invention solves the problem of dull appearance of a glitter composition by improving its wet state clarity.

The present invention therefore is directed to a composition having wet state clarity comprising:

a first aqueous binder combination of polymer particles having a diameter of less than 80 nanometers and a thickener or a second aqueous binder combination of polymer particles having a diameter of less than 120 nanometers and a polyurethane thickener.

The present invention is further directed to a method of applying the composition on a substrate comprising:

dispensing a layer of the composition on the substrate.

For the purposes of this invention, "polymer particles" means polymerized polymer particles dispersed in an aqueous medium and "binder combination" means an aqueous solution of a thickener having polymer particles dispersed therein.

Applicants have discovered that an aqueous binder combination having the desired wet state clarity index of less than 65 is attained by matching an aqueous dispersion of polymer particles of certain size with an appropriately selected thickener. Applicants discovered that when polymer particles having a diameter of less than 80 nanometers is mixed with any thickener, a binder combination having the desired wet state clarity index of less than 65 is attained. In addition, when an aqueous dispersion of polymer particles having a diameter of less than 120 nanometers is mixed with a polyurethane thickener, the desired wet state clarity index of less than 65 is attained. A binder combination outside these ranges, i.e., a binder combination of an aqueous dispersion of polymer particles having a diameter in excess of 120 nanometers with any thickener or a binder combination of an aqueous dispersion of polymer particles having a diameter of less than 120 nanometers but greater than 80 nanometers with a non-polyurethane thickener results in a cloudy or milky binder combination having a wet state clarity index in excess of 65.

The preferred embodiment of the present invention comprises the first aqueous binder combination, which includes from 20 percent to 60 percent by weight, preferably from 30 percent to 50 percent by weight, of the polymer particles having a diameter of less than 80 nanometers. The weight percentages are based on the total weight of the composition.

The polymer particles of the preferred first aqueous binder combination have particle size in the range of 20 to 80 nanometers, preferably in the range of 30 to 60 nanometers and most preferably in the range of 30 to 50 nanometers.

The polymer particles are preferably copolymers of at least one ethylenically unsaturated monomer, such as, for example, acrylic ester monomers including methyl acrylate, ethyl acrylate, butyl acrylate, 2-ethylhexyl acrylate, decyl acrylate, methyl methacrylate, butyl methacrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate; acrylamide or substituted acrylamides; styrene or substituted styrenes; butadiene; ethylene; vinyl acetate or other vinyl esters; vinyl monomers, such as, for example, vinyl chloride, vinylidene chloride, N-vinyl pyrrolidone; amino monomers, such as, for example, N,N'-dimethylamino (meth)acrylate; and acrylonitrile or methacrylonitrile. Additionally copolymerizable ethylenically-unsaturated acid monomers in the range of, for example, 0.1% to 10%, by weight based on the weight of the emulsion-polymerized polymer, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate, may be used.

The polymer used in this invention is a substantially thermoplastic or substantially uncrosslinked polymer when applied to the substrate. If desired, premature crosslinking or gelling of the polymer is induced by adding to the monomer mix multi-ethylenically unsaturated monomers in the range of 0.1% to 5%, by weight based on the weight of the polymer. Typical multi-ethylenically unsaturated monomers include allyl methacrylate, diallyl phthalate, 1,4-butylene glycol dimethacrylate, 1,6-hexanedioldiacrylate and divinyl benzene. It is important, however, that the quality of the film formation is not materially impaired.

The glass transition temperature of the polymer particles is in the range of −40° C. to 120° C., as measured by conventional differential scanning calorimetry (DSC). To measure the Tg by this method, the polymer particles samples were dried, preheated to 120° C., rapidly cooled to −100° C., and then heated to 150° C. at a rate of 20° C./minute while data was being collected. The Tg was measured at the midpoint of the inflection using the half-height method. The latex polymers particles having a Tg in the range of −20° C. to 80° C. are preferred.

The polymerization techniques used to prepare such latex polymers particles are well known in the art. The polymer particles are preferably prepared by emulsion polymerization. Either thermal or redox intiation processes may be used. Redox systems using the same initiators coupled with a suitable reductant such as, for example, isoascorbic acid and sodium bisulfite may be used at similar levels.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05% to 3.0% by weight, based on the weight of total monomer.

Chain transfer agents, such as, for example, mercaptans may be used in an amount effective to provide a GPC weight average molecular weight of 10,000 to 1000,000. "GPC weight average molecular weight" means the weight average molecular weight determined by gel permeation chromatography (GPC) described on page 4, Chapter I of The Characterization of Polymers published by Rohm and Haas Company, Philadelphia, Pa. in 1976, utilizing polymethyl methacrylate as the standard.

The diameter of the polymer particles is controlled by the amount of conventional surfactants added during the polymerization process. It is known in the art that by increasing the amount of surfactant added during polymerization, the diameter of the polymer particles can be reduced and by reducing the amount of surfactant, one can increase the diameter of the polymer particles. The particle size front 20 to 120 nanometers is achieved by adding from 6% to 0.1% surfactant by weight, based on the weight of total monomer, respectively. Conventional surfactants include anionic, nonionic emulsifiers or their combination. Anionic emulsifier is preferred. Typical anionic emulsifiers include alkali or ammonium alkyl sulfates, alkyl sulfonic acids, fatty acids, and oxyethylated alkyl phenols. Sodium lauryl sulfate is preferred. Typical nonionic emulsifiers include polyoxyethylenated alkylphenols, alkylphenol ethoxylates, polyoxyethylenated straight-chain alcohol, amine polyglycol condensate, modified polyethoxy adducts, polyoxyethylenated mercaptans, long chain carboxylic acid esters, modified terminated alkylaryl ether, and alkylpolyether alcohols. Polyoxyethylenated mercaptans are preferred.

Alternatively, the individual polymer particles include multi-stage polymer particles provided with two or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 percent to 95 percent, by weight based on the total weight of the particle and is preferably softer than the inner phase. Two-stage polymer particles are preferred. The Tg of the outer phase is preferably at least 30° C. less than the Tg of the inner phase. A GPC weight average molecular weight of these two-stage polymer particles is preferably in the range of 10,000 to 1,000,000.

The multi-stage polymer particles are prepared by conventional emulsion polymerization process, preferably by emulsion polymerization, in which at least two stages differing in composition are formed in a sequential fashion. Such a process usually results in the formation of at least two mutually incompatible polymer compositions, thereby resulting in the formation of at least two phases. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

Alternatively, polymer particles suitable for the present invention also include dispersions of polyurethane particles in an aqueous continuous phase. These polyurethane dispersion (PUD) compositions are desirable due to their advantageous properties such as good chemical resistance, abrasion-resistance, toughness, elasticity and durability. A typical waterborne PUD is a poly(urethane-urea) which contains both urethane and urea groups.

The polymer particles of polyurethane are made by the well known reaction between polyols and polyisocyanates to give isocyanate terminated prepolymers. These prepolymers are then dispersed into an aqueous medium. Diamine and triamines are often added to the aqueous dispersion of the prepolymer to react with the remaining isocyanate groups for increasing the molecular weight of the polymer particles and for incorporating more urea groups in the polymer chain. After dispersion the remaining isocyanate groups in the prepolymer can also react with water to yield an amine. These amines will also react with isocyanate groups to chain extend the prepolymer. The polyols used to prepared PUDs can be either linear or branched polyethers, polyesters, or polycarbonates polyols. Low molecular weight diols and triols are often used in conjunction with the higher molecular weight polyols to adjust the amount of urethane content and branching in the PUD. The low molecular weight polyols can also contain acid (for example carboxyl or sulfonic acid) groups or amine groups which can aid in the dispersion and stabilization of the PUD. The polyisocyanate can be any aliphatic, cycloalophatic or aromatic multifunctional isocyanate. The chain extenders can be any multifunctional amine, hydrazine, multifunctional hydrazine or hydrazide. Optionally internal emulsifiers may be added to the prepolymer for aiding in the dispersion of the prepolymer into the aqueous medium. The internal emulsifiers include diol or diamines that contain ionic groups, such as, carboxyl or sulfonate; multifunctional isocyanates that contain these ionic groups; nonionic hydrophilic polymer segments, such as, polyoxyethylene diols; or diols and diamines that contain these nonionic hydrophilic polymer segments.

The particle size of the polyurethane particles can be controlled during the dispersion stage by controlling the combination of shear forces generated during the dispersion stage, viscosity of the prepolymer, the temperature of the aqueous dispersing medium and acid or amine groups and internal emulsifiers in the prepolymer. The particle size is decreased by:

1) increasing the level of acid or amine groups;
2) increasing the internal emulsifiers in the prepolymer;
3) increasing the shear forces generated during the dispersion stage;
4) increasing the temperature of the aqueous dispersing medium; or
5) decreasing the viscosity of the prepolymer.

The particle size is increased by reversing the factors described above.

If desired the polymer particles may comprise a physical blend of particles of single or multi-stage copolymers of at least one ethylenically unsaturated monomer and a polyurethane dispersion. The blend comprises from 0 percent to 100 percent by weight of the single or multi-stage copolymers of at least one ethylenically unsaturated monomer and 100 percent to 0 percent by weight of the polyurethane dispersion particles. All the weight percentages are based on the total weight of the polymer particles.

Alternatively, the polymer particles may comprise a multi-stage polymer wherein a first stage is a copolymer of at least one ethylenically unsaturated monomer and a second stage is a polyurethane. The multi-stage polymer comprises from 0 percent to 100 percent by weight of the first stage and 100 percent to 0 percent by weight of the second stage. All the weight percentages are based on the total weight of the polymer.

The first aqueous binder combination further includes a thickener for thickening of the composition. A polyurethane thickener is preferred since, it provides better wet state clarity than non-polyurethane thickeners. The more preferred polyurethane thickener described in the U.S. Pat. No. 5,281,654, is an aqueous mixture of polyurethanes comprising a first polyurethane with at least two end groups, where each end group includes a terminal isocyanate and a polyether; a second polyurethane with at least two end groups, where each end group includes a terminal isocyanate group and a non-functional group; and a third polyurethane with at least two end groups, where one end group includes a terminal isocyanate and a polyether and one other end group includes a terminal isocyanate and a non-functional group. Each of the polyurethanes in the mixture may be present in an amount ranging from 5 to 90 mole percent. More preferably, the first polyurethane is present in the mixture in an amount ranging from 8.3 to 75 mole percent, the second polyurethane is present in the mixture in an amount ranging from 8.3 to 75 mole percent, and the third polyurethane is present in the mixture in an amount ranging from 16.7 to 83.4 mole percent.

This polyurethane thickener provides the composition of the present invention with a non-zero gel strength, which is described in the U.S. Pat. No. 5,281,654. The gel strength in the range of 10 grams per centimeter to 50 grams per centimeter provides the resulting composition with sag and slump resistance. The gel strength is measured using the ICI gel strength tester described in the U.S. Pat. No. 5,281,654. Compositions having non-zero gel strength are particularly desirable for maintaining the three dimensional structure of extruded beads and lines.

Alternatively, the first aqueous binder combination includes any non-polyurethane clear thickener that provides the necessary viscosity build-up of the glitter composition. The non-polyurethane thickeners suitable for use include acrylic copolymer thickeners exemplified in the U.S. Pat. Nos. 3,026,281 and 3,035,004; acrylic copolymer hydrophobically modified associative thickeners exemplified in the U.S. Pat. No. 4,384,096; cellulose ether nonassocitive organic thickeners, disclosed in the U.S. Pat. Nos. 4,228,277 and 4,243,802; hydrophobically modified hydroxyethyl cellulose nonassocitive organic thickeners; poly(ethylene oxide) nonassociative thickeners disclosed in the U.S. Pat. Nos. 4,079,028 and 4,155,892, and polyacrylamide nonassociative thickeners disclosed in the U.S. Pat. No. 4,425,469.

The amount of the thickener added to the first aqueous binder combination will be determined by the properties desired in both the application as well as the post-application properties of the composition. Such properties are attained by controlling the viscosity of the binder combination. For example, by increasing the viscosity, the binder combination can be thickened, such that a three-dimensional artistic structure deposited on a substrate by a user will hold its shape during drying and curing of the structure on the substrate. By way of example, the binder combination having a viscosity in the range of 5,000 to 100,000 centipoise (cps) is suitable for producing three-dimensional artistic structures. The viscosity in this range is measured by utilizing the Brookfield Viscometer Model No. LVF supplied by Brookfield Engineering Laboratories, Inc., Stoughton, Mass. The range of viscosity is attained by adding from 0.1 percent to 10 percent by weight of the dry thickener to the dry weight of the polymer particles of the first aqueous binder combination.

Conversely, by reducing the amount of the thickener in the binder combination, the binder combination can be thinned to permit brushing of the composition onto a substrate. By way of example, the viscosity in the range of 500 to 10,000 cps is suitable for brushing the composition onto a substrate. The viscosity in this range is measured by utilizing the Brookfield Viscometer. The range of viscosity is attained by adding from 0.1 percent to 5 percent by weight of the dry thickener to the dry weight of the polymer particles of the first aqueous binder combination.

Applicants have discovered that a polyurethane thickener provides the binder combination with better wet state clarity than a non-polyurethane thickener. Thus, the size of the polymer particles can be increased to up to 120 nanometers without adversely affecting the wet state clarity of the composition of the present invention. Therefore, the alternate embodiment of the composition of the present invention includes a second aqueous binder combination of polymer particles having a diameter of less than 120 nanometers and the polyurethane thickener.

Except for the particle size, the polymer particles having a diameter of less than 120 nanometers are similar to the polymer particles having a diameter of less than 80 nanometers, described earlier. The size of the polymer particles is adjusted by varying the amount of surfactant used during the polymerization of the polymer particles. The second aqueous binder combination offers an advantage of a wider tolerance on controlling the diameter of the polymer particles having a diameter of less than 120 as compared to the first aqueous binder combination utilizing the polymer particles having a diameter of less than 80.

The composition of the present invention preferably includes glitter flakes dispersed in the first or second aqueous binder combination to provide a glitter effect. Glitter flakes typically comprise polyester flakes coated with aluminum which are dyed to a variety of colors. The mean flake particle size is preferably in the range of 2.58 square millimeters (0.004 square inches) to 5.16 square millimeters (0.008 square inches). Commercially available glitter flakes include those sold under the name of POLY*FLAKE, supplied by GLITTEREX Corporation of Belleview, N.J. The ratio of glitter flakes to the binder combination is not critical to the functioning of the composition or to achieving its benefits. The composition includes from 0.1 percent to 20 percent, preferably 1 percent to 10 percent, by weight of the latex binder combination of the glitter flakes. Any conventional mixing means, such as, for example, a blade mixer, can be employed to substantially uniformly disperse the glitter flakes in the latex binder. If desired, the glitter flakes may be provided with different colors to generate varying colors in the glitter composition. The glitter composition may also be provided with a tint of fluorescent or pearlescent pigment.

Depending on the intended use of the composition, additional components may be added to any of the compositions described earlier. These additional components include but not limited to pigments, defoamers, waxes, silicone-based slip additives, wetting agents, preservatives, plasticizers, cosolvents and freeze/thaw protectors.

The present composition may be suitably stored in a dispenser, such as a translucent plastic squeeze bottle or tube.

The composition of the present invention provides for a coating which, after drying, has a high degree of gloss and further, when applied to fabrics such as cotton or cotton polyester blends, is capable of maintaining this high degree of gloss even after repeated laundering steps.

The composition of the present invention is also able to hold three-dimensional beads or lines on fabric or cloth even after drying. If desired, the glitter composition can be brush applied flat on fabric or cloth.

Furthermore, the composition of the present invention that includes a first or second aqueous binder combination having polymer particles made from two-stage polymers lowers the tackiness and improves the crack resistance of the resultant composition applied to a fabric surface, even when the fabric is subjected to repeated laundering steps.

The composition of the present invention may also be utilized in personal care items, such as, nail polish, hair shampoo and conditioners.

TEST PROCEDURES

The following test procedures were used for generating the data reported in the Examples below:
Determination of the wet state clarity of the binder combination:

The wet state clarity of the binder combination was determined by using a Colorgard Systent Model #05 (Byk Gardner) colorimeter, supplied by Gardner Instrument Company of Long Island, N.Y. The colorimeter determines the intensity of the scattered light reflecting off a binder combination layer in the wet state, i.e., before the binder combination layer dries into a coating. By way of comparison, the intensity of the scattered light (L) for a white layer will be highest and the intensity of the scattered light for a transparent layer will be lowest.

To eliminate the scattering effect front the equipment and the surroundings, a test plate of black glass was used as the standard. The measure of wet state clarity comes from the difference ($\Delta L$) between the L value obtained for a sample layer and the L value obtained for the test plate. Under these conditions a white opaque color tile (#1027) has a $\Delta L$ of 94.8 and a latex binder having an acceptable degree of wet state clarity has a $\Delta L$ value of less than 65. By comparison, the wet state clarity index of milky or cloudy binders used in conventional glitter compositions is about 70.

A uniformly thick layer was produced from 2 grants of the latex binder and placed in a 35×10 mm polystyrene petri dish. The sides of the dish were wrapped in black tape to prevent contributions from stray light. To measure the $\Delta L$ value off the sample layer, the petri dish was positioned in the colorimeter and the test plate was placed on top of the sample layer. A light beam of a standardized intensity was reflected of the sample layer and a $\Delta L$ value for the sample layer was recorded.

Particle Size Determination:

The diameter of the polymer particles was measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series. To measure the particle diameter, 0.1 to 0.2 grants of a sample of acrylic polymer was diluted to a total of 40 ml with distilled water. A 2 ml portion was delivered into an acrylic cell, which was then capped. The particle size was measured for 1000 cycles. The measurement was repeated three times and an average was reported.

EXAMPLES

Examples 1 through 4, included in Examples 5 through 8 listed in Table I below, were prepared in accordance with the following procedure:

Example 1 (Polymer 1)

In a 18.927-liter (5-gallon) stirred reactor, 7,250 grants of deionized (DI) water and 300.8 grants (28% active) sodium lauryl sulfate were heated to 85° C. A solution of 9.07 grants sodium carbonate in 105.4 grants of deionized water was charged to the reaction followed by the addition of 22.94 grams ammonium persulfate dissolved in 126.5 grams of deionized water. Two minutes later a monomer emulsion comprising 4529.7 grams deionized of water, 44.71 grams (28% active) of sodium lauryl sulfate, 4469.3 grams of methyl methacrylate, 845.54 grams of isobutyl methacrylate, 483.2 grams of styrene, and 241.6 grams of methacrylic acid was prepared and gradually added to the stirred reactor at a feed rate of 53 grams/10 minutes. After 20 minutes the feed rate was increased to 120 grams/minute. A batch temperature of 85° C. was maintained throughout the 105 minute gradual addition feed period. On completion of the monomer emulsion feed, the batch was held for 30 minutes at 85±2° C. before cooling to 60° C. A redox chase was added and the batch was neutralized to pH=7.5 with aqueous ammonia. The final product had solids at 32.3 weight percent of the total weight of Polymer 1. The polymer particle size of Polymer 1 was measured to be 34 nanometers.

Example 2 (Polymer 2)

A 4-neck, 5-liter stirred reaction flask containing 1514 grams of deionized water, 55.17 grams of sodium alkyl phenyl sulfonate (23% active) was heated to 85° C. 51.3 grams of Feed 1 monomer emulsion (described below), 3.63 grams of ammonium persulfate dissolved in 40 grams of deionized of water, and 4.57 grams of sodium carbonate dissolved in 70 grams of deionized of water were charged sequentially to the reaction flask. Feed 1 monomer emulsion includes 485.2 grams deionized of water, 85.2 grams of sodium alkyl phenyl sulfonate (23% active) 924.7 grams of butyl methacrylate 493.2 grams of methyl methacrylate, 331.8 grams of butyl acrylate, and 63.5 grams of methacrylic acid. Feed 2 comprising 0.91 grams ammonium persulfate dissolved in 111 grams of deionized water was prepared separately. After a 5 minute hold period, a gradual addition of both Feed 1 and Feed 2 was started and fed to completion at a uniform rate over three hours. A batch temperature of 85±2° C. was maintained throughout the gradual addition of Feeds 1 and 2. On completion of the gradual addition, the batch was held at 85±2° C. for 30 minutes before cooling to 65° C. At 65° C., two redox chasers were added. The batch was neutralized to pH=7.9 with 28% aqueous ammonia. The final product had solids at 41.2 weight percent of the total weight of Polymer 2. The polymer particle size of Polymer 2 was measured to be 92 nanometers.

Example 3 (Polymer 3)

Polymer particles of Sancur® 2725 polyurethane dispersion were used as polymer 3. Sancur® 2725 polyurethane dispersion is supplied by Sanncor Industries, Inc., Leominster, Mass. The polymer particle size of Polymer 3 was measured to be 40 nanometers.

Example 4 (Thickener B)

A dried polyurethane thickener was prepared in accordance with Example 1 described in the U.S. Pat. No. 5,281,654. 195 grams of a polyethylene glycol having a weight average molecular weight of 8,000, 325 grams toluene, and 0.2 grants dibutyltin diluarate were added to a one liter flask to form a mixture. The mixture was azeotropically dried by refluxing the mixture and collecting any water in a Dean-Stark trap, cooled to 80° C., and 8.2 grams of methylene bis(4-cyclohexyl isocyanate) was added. After 2.5 hours, a mixture of 4.7 grams of 1-octadecanol and 11.5 grams of a polyethylene glycol methyl ether having a weight average molecular weight of 2,000 was added. The mixture was held at 80° C. for 4 hours and then cooled. The solid product was isolated by evaporation of the toluene. The resulting polyurethane thickener was then dispersed in a mixture of 544 grants of deionized water and 153.6 grams of diethylene glycol monobutyl ether to form Thickener B.

The Examples 5 through 8 were prepared by adding and mixing the ingredients listed in Table I below. A conventional laboratory mixer was used. In case of Examples 5 and 6, Thickener A, which is Cellosize® Hydroxyethyl Cellulose (HEC) OP-100MH thickener, supplied by Union Carbide Corporation, Danbury, Conn., was used. The amount of Thickener A or B added to Polymer 1, 2 or 3 was adjusted to provide the resulting latex binder combination with a viscosity in the range of 10,000 to 17,000 cps.

TABLE I

| Example 5 | Example 6 | Example 7 | Example 8 |
|---|---|---|---|
| 100 g Polymer 1 | 100 g Polymer 2 | 100 g Polymer 1 | 100 g Polymer 3 |
| 0.66 g Thickener A | 0.55 g Thickener A | 1.24 g Thickener B | 1.7 g Thickener B |

The wet state clarity (ΔL) of the films of Examples 5 through 8, listed in Table II below, was measured by the process described earlier:

TABLE II

| Example | ΔL |
|---|---|
| 5 | 57 |
| 6 | 71.2 |
| 7 | 17.2 |
| 8 | 20.6 |

By comparing the data in Table I and Table II, it is seen that the first aqueous binder combination (Example 7) of polymer particles having a diameter of 34 nanometers (Polymer 1 of Example 1 ) and a polyurethane thickener (Thickener B of Example 4) and another first aqueous binder combination (Example 5) of polymer particles having a diameter of 34 nanometers (Polymer 1 of Example 1 ) and a non-polyurethane thickener (Thickener A) provide acceptable wet state clarity (ΔL) of 17.2 and 57, respectively. Still another first aqueous binder combination (Example 8) of polymer particles having a diameter of 40 nanometers (Polymer 3 of Example 3) and a polyurethane thickener (Thickener B of Example 4) provides acceptable wet state clarity (ΔL) of 20.6. By comparison, Example 6, which includes polymer particles having a diameter of 92 nanometers (Polymer 2) and a non-polyurethane thickener (Thickener A) has an unacceptable wet state clarity (ΔL) of 71.2.

We claim:

1. A composition in its wet state having a wet state clarity index (ΔL) of less than 65 comprising:

a first aqueous binder combination having said wet state clarity, said first combination comprising polymer particles having a diameter of less than 80 nanometers and a thickener or a second aqueous binder combination having said wet state clarity, said second combination comprising polymer particles having a diameter of less than 120 nanometers and a polyurethane thickener comprising an aqueous mixture of polyurethanes, which includes a first polyurethane with at least two end groups, wherein each end group comprises a terminal isocyanate and a polyether; a second polyurethane with at least two end groups, wherein each end group comprises a terminal isocyanate group and a non-functional group; and a third polyurethane with at least two end groups, wherein one end group comprises a terminal isocyanate and a polyether and one other end group comprises a terminal isocyanate and a non-functional group.

2. The composition of claim 1 further comprising glitter flakes, a pigment or a combination of said glitter flakes and said pigment.

3. The composition of claim 1 wherein said polyurethane thickener or said thickener comprises from 0.1% to 20% by weight of said composition.

4. The composition of claim 1 wherein said aqueous mixture comprises said first polyurethane in the range of 8.3 to 25 mole percent, said second polyurethane in the range of 25 to 75 mole percent and said third polyurethane in the range of 16.7 to 50 mole percent.

5. The composition of claim 5 wherein said polymer particles having a diameter of less than 120 nanometers comprise an addition polymerized copolymer of at least one ethylenically unsaturated monomer.

6. The composition of claim 5 wherein said ethylenically unsaturated monomer is selected from the group consisting of methyl acrylate, ethyl acrylate, butyl acrylate, 2-ethylhexyl acrylate, decyl acrylate, methyl methacrylate, butyl methacrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, hydroxypropyl (meth)acrylate, acrylamide or substituted acrylamides, styrene or substituted styrenes, butadiene, vinyl acetate, vinyl chloride, vinylidene chloride, N-vinyl pyrrollidone, N,N'-dimethylamino (meth)acrylate, acrylonitrile and methacrylonitrile.

7. The composition of claim 1 wherein said polymer particles having a diameter of less than 120 nanometers comprise a two-stage polymer.

8. The composition of claim 1 wherein said polymer particles having a diameter of less than 120 nanometers in said second aqueous binder combination are selected from the group consisting of:
   an aqueous dispersion of polyurethane particles;
   a physical blend of from 0 percent to 100 percent by weight of particles of single or multi-stage copolymers of at least one ethylenically unsaturated monomer and 100 percent to 0 percent by weight of a polyurethane dispersion; and
   a multi-stage polymer wherein a first stage is a copolymer of from 0 percent to 100 percent by weight of the first stage of at least one ethylenically unsaturated monomer and a second stage is a polyurethane of 100 percent to 0 percent by weight of the second stage.

9. A method of applying the composition of claim 1 on a substrate comprising:
   dispensing a layer of said composition on said substrate.

10. An artist, craft and hobby paint composition in its wet state having a wet state clarity index ($\Delta L$) of less than 65 comprising:
   a first aqueous binder combination comprising polymer particles having a diameter of less than 80 nanometers and a thickener.

11. The composition of claim 1 or 10 wherein said thickener is a polyurethane thickener comprising an aqueous mixture of polyurethanes, which includes a first polyurethane with at least two end groups, wherein each end group comprises a terminal isocyanate and a polyether; a second polyurethane with at least two end groups, wherein each end group comprises a terminal isocyanate group and a non-functional group; and a third polyurethane with at least two end groups, wherein one end group comprises a terminal isocyanate and a polyether and one other end group comprises a terminal isocyanate and a non-functional group.

12. An artist, craft and hobby paint composition in its wet state having a wet state clarity index ($\Delta L$) of less than 65 comprising:
   a aqueous binder combination comprising polymer particles having a diameter of less than 120 nanometers and a polyurethane thickener comprising at aqueous mixture of polyurethanes, which includes a first polyurethane with at least two end groups, wherein each end group comprises a terminal isocyanate and a polyether; a second polyurethane with at least two end groups, wherein each end group comprises a terminal isocyanate group and a non-functional group; and a third polyurethane with at least two end groups, wherein one end group comprises a terminal isocyanate and a polyether and one other end group comprises a terminal isocyanate and a non-functional group.

13. The composition of claim 1, 10 or 12 further comprising glitter flakes, a pigment or a combination of said glitter flakes and said pigment.

14. The composition of claim 1 or 12 wherein said thickener or said polyurethane thickener comprises from 0.1% to 20% by weight of said composition.

15. The composition of claim 1 or 12 wherein said aqueous mixture comprises said first polyurethane in the range of 8.3 to 25 mole percent, said second polyurethane in the range of 25 to 75 mole percent and said third polyurethane in the range of 16.7 to 50 mole percent.

16. The composition of claim 1 or 12 wherein said polymer particles having a diameter of less than 120 nanometers comprise an addition polymerized copolymer of at least one ethylenically unsaturated monomer.

17. The composition of claim 1 or 12 wherein said polymer particles having a diameter of less than 120 nanometers comprise an addition polymerized copolymer of at least one ethylenically unsaturated monomer selected from the group consisting of methyl acrylate, ethyl acrylate, butyl acrylate, 2-ethylhexyl acrylate, decyl acrylate, methyl methacrylate, butyl methacrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, hydroxypropyl (meth)acrylate, acrylamide or substituted acrylamides, styrene or substituted styrenes, butadiene, vinyl acetate, vinyl chloride, vinylidene chloride, N-vinyl pyrrollidone, N,N'-dimethylamino (meth)acrylate, acrylonitrile and methacrylonitrile.

18. The composition of claim 1 or 12 wherein said polymer particles having a diameter of less than 120 nanometers comprise a two-stage polymer.

19. The composition of claim 1 or 12 wherein said polymer particles having a diameter of less than 120 nanometers in said second aqueous binder combination are selected from the group consisting of:
   an aqueous dispersion of polyurethane particles;
   a physical blend of from 0 percent to 100 percent by weight of particles of single or multi-stage copolymers of at least one ethylenically unsaturated monomer and 100 percent to 0 percent by weight of a polyurethane dispersion; and
   a multi-stage polymer wherein a first stage is a copolymer of from 0 percent to 100 percent by weight of the first stage of at least one ethylenically unsaturated monomer and a second stage is a polyurethane of 100 percent to 0 percent by weight of the second stage.

20. A method of applying the composition of claim 1, 10 or 12 on a substrate comprising:
   dispensing a layer of said composition on said substrate.

* * * * *